(12) United States Patent
Fresko et al.

(10) Patent No.: US 7,770,169 B2
(45) Date of Patent: Aug. 3, 2010

(54) THREAD RENDEZVOUS FOR READ-ONLY CODE IN AN OBJECT-ORIENTED COMPUTING ENVIRONMENT

(75) Inventors: Nedim Fresko, San Francisco, CA (US); Christopher J. Plummer, San Martin, CA (US); Dean R. Long, Boulder Creek, CA (US)

(73) Assignee: Oracle America, Inc., Redwood City, CA (US)

( * ) Notice: Subject to any disclaimer, the term of this patent is extended or adjusted under 35 U.S.C. 154(b) by 1187 days.

(21) Appl. No.: 10/847,779

(22) Filed: May 17, 2004

(65) Prior Publication Data

US 2005/0268273 A1   Dec. 1, 2005

(51) Int. Cl.
G06F 9/46 (2006.01)
G06F 12/00 (2006.01)

(52) U.S. Cl. ...................................... 718/100; 707/813

(58) Field of Classification Search ................ 718/108, 718/102, 104, 100; 707/813
See application file for complete search history.

(56) References Cited

U.S. PATENT DOCUMENTS

| | | | |
|---|---|---|---|
| 4,074,353 A | 2/1978 | Woods et al. | |
| 4,484,271 A | 11/1984 | Miu et al. | |
| 4,942,524 A | 7/1990 | Nunomura | |
| 5,953,736 A * | 9/1999 | O'Connor et al. | 711/6 |
| 5,987,495 A | 11/1999 | Ault et al. | |
| 6,098,089 A * | 8/2000 | O'Connor et al. | 718/104 |
| 6,308,319 B1 * | 10/2001 | Bush et al. | 717/141 |
| 6,336,184 B1 | 1/2002 | Burke et al. | |
| 6,542,990 B1 * | 4/2003 | Tremblay et al. | 712/227 |
| 6,704,862 B1 | 3/2004 | Chaudhry et al. | |
| 6,842,853 B1 * | 1/2005 | Bush et al. | 712/228 |
| 6,854,115 B1 * | 2/2005 | Traversat et al. | 718/1 |
| 6,862,650 B1 * | 3/2005 | Matthews et al. | 711/6 |
| 6,934,832 B1 | 8/2005 | Van Dyke et al. | |
| 7,076,631 B2 | 7/2006 | Herron | |
| 7,360,213 B1 * | 4/2008 | Alfieri | 718/100 |
| 7,376,940 B1 * | 5/2008 | Bush et al. | 717/149 |
| 2002/0042807 A1 * | 4/2002 | Thomas et al. | 709/1 |

(Continued)

OTHER PUBLICATIONS

Ole Agesen, "GC points in a threaded environment" Sun, 1998, pp. 1-20.*

(Continued)

*Primary Examiner*—Meng-Ai An
*Assistant Examiner*—Caroline Arcos
(74) *Attorney, Agent, or Firm*—Marsh Fischman & Breyfogle LLP; Kent A. Lembke; R. Mahboubian

(57) ABSTRACT

Techniques for assuring thread rendezvous for a plurality of threads executing in a computing system are disclosed. Techniques can be used to assure thread rendezvous for read-only code in a manner that is more efficient than polling techniques. A Light-weight, Yet Trappable On Demand (LYTOD) instruction can be generated for code that is executed by one or more threads. Typically, a LYTOD instruction is generated at critical points of the code in order to assure safe-point thread rendezvous. The LYTOD is a lightweight instruction that can change its behavior from a lightweight instruction to an instruction that causes a trap when executed. The LYTOD can, for example, be implemented as a read-from-memory instruction that operates to load a register with a content of a valid memory location.

16 Claims, 4 Drawing Sheets

U.S. PATENT DOCUMENTS

| | | |
|---|---|---|
| 2002/0052926 A1 * | 5/2002 | Bush et al. ............... 709/217 |
| 2002/0188825 A1 | 12/2002 | Seal et al. |
| 2003/0014613 A1 * | 1/2003 | Soni ........................ 712/217 |
| 2003/0018681 A1 * | 1/2003 | Subramanian et al. ...... 709/102 |
| 2003/0101326 A1 | 5/2003 | Fallah et al. |
| 2003/0204778 A1 * | 10/2003 | Wilding et al. ............. 714/19 |
| 2003/0212878 A1 * | 11/2003 | Ting ........................ 712/23 |
| 2004/0261068 A1 | 12/2004 | Ju |
| 2005/0080753 A1 | 4/2005 | Vega et al. |
| 2005/0120194 A1 * | 6/2005 | Kissell ..................... 712/242 |

OTHER PUBLICATIONS

"Class Rendezvous," EDU.oswego.cs.dl.util.concurrent, pp. 1-8.

* cited by examiner

THREAD RENDEZVOUS FOR READ-ONLY CODE IN AN OBJECT-ORIENTED COMPUTING ENVIRONMENT

BACKGROUND

The present invention relates generally to computing systems, and more particularly, to techniques for assuring thread rendezvous in an object-oriented computing environment.

In modern computing systems, often there is a need to suspend the execution of all threads. Typically, each thread of execution is suspended at a safe-point where all references (e.g., pointer types) used by the thread are known ("precisely known"). For example, all the pointers that reference an object should be known in case there is a need to move the object during garbage collection where objects may be moved in memory. In general, thread rendezvous at a safe-point is needed for synchronization of all threads. As such, thread rendezvous is crucial to various applications (e.g., modern garbage collection applications).

Conventionally, polling is used to achieve thread rendezvous where a polling code (or instruction) is generated at a number of critical points in the code. Every time a polling code (or instruction) is executed by a thread of execution, a determination is made as to whether there is a need (or a request pending) for all threads of execution to rendezvous (i.e., suspend execution until all other threads have been suspended). If there is a request for thread rendezvous, the thread is suspended at the point in the code where the polling was executed. The thread is suspended until all other threads have also suspended their execution (i.e., thread rendezvous).

Although polling can effectively be used to achieve thread rendezvous, polling requires a significant amount of computing resources. The significant amount of computing resources is needed because, among other things, each polling code (or instruction) requires more than four (4) or five (5) Central Processing Unit (CPU) cycles.

A relatively more efficient technique for assuring thread rendezvous is "code patching." Instead of generating polling code, "code patching" dynamically writes (or patches code) with an "unconditional stop" instruction. The "unconditional stop" instruction is dynamically written (or patched) in a number of critical points in the code where it would be polled, but unlike polling, the "unconditional stop" instruction is "patched" only when there is a request for thread rendezvous. In other words, under normal circumstances, there is no "unconditional stop" instruction. The "unconditional stop" instruction is dynamically written (or patched) only when there is a need for polling. The execution of each thread is suspended as soon as the "unconditional stop" instruction is encountered. When all threads have been suspended and thread rendezvous has been achieved, the "unconditional stop" instructions can effectively be taken out of the code. When there is a need for thread rendezvous, the code can be patched again with the "unconditional stop" instruction at various points of execution to assure that the thread will suspend.

Although "patching" is relatively more efficient than polling, it can not be used, among other things, for "read-only" code. "Read-only" code requires that the code remain unchanged. However, "patching" requires modifying the code. Hence, polling techniques are conventionally used to achieve thread rendezvous when code is implemented as "read-only." However, as noted above, polling is not as efficient as "code patching."

It should also be noted that "read-only" code has many applications. Modern computing systems (e.g., virtual machines) require some code to be implemented as "read-only" code. By way of example, "read-only" code is used in computing systems (e.g., virtual machines) that perform ahead-of-time compilation, or systems that use process cloning to implement a variety of functions (e.g., application startup). "Code patching" cannot be used for read-only code and polling uses a significant amount of resources. Thus, there is a need for more efficient techniques that can be used to assure thread rendezvous for "read-only" code.

Accordingly, alternative methods for assuring thread rendezvous are useful.

SUMMARY

Broadly speaking, the invention relates to techniques for assuring thread rendezvous in an object-oriented computing environment.

As noted in the background section, alternative methods for assuring thread rendezvous are useful. These techniques should allow thread rendezvous for "read-only" code in a manner that would be more efficient than conventional polling techniques.

In accordance with one aspect of the invention, a Lightweight, Yet Trappable On Demand (LYTOD) instruction can be generated for code that is executed by one or more threads. Typically, a LYTOD instruction is generated at critical points of the code in order to assure safe-point thread rendezvous. Thread rendezvous is achieved when each thread of execution is suspended at a safe point (i.e., a point where the position of all pointers are known). As will be appreciated, the LYTOD is a lightweight instruction that takes less CPU cycles to execute than a conventional polling implementation which takes four (4) or five (5) CPU cycles for each polling instruction to execute. Moreover, the LYTOD can change its behavior from a lightweight instruction to an instruction that causes a trap when executed. In other words, the LYTOD is a lightweight instruction that does not cause a trap or any other undesired side effects, yet it can be made to cause a trap on demand. The trap can invoke a trap-handler which in turn causes all threads of execution to rendezvous by changing the context of the execution to a rendezvous code. After execution of all threads has been suspended, the behavior of the LYTOD can be changed to be a lightweight instruction.

In one embodiment, the LYTOD is implemented as a read-from-a memory-address instruction that operates to load a register with a content of a valid memory location. Initially, the memory address location has a valid content so that the read-from-a memory-address instruction behaves as a lightweight instruction that does not cause a trap or any undesired side effects. When there is a need for thread rendezvous, the behavior of read-from-a memory-address instruction is altered so that it attempts to read from an invalid memory address (e.g., zero (0) in Unix operating systems). As a result, the read-from-a memory-address instruction causes a trap which invokes a trap-handler. The context of the execution is changed to rendezvous code which assures suspension of all threads. The rendezvous code can also restore the behavior of the read-from-a memory-address instruction to a light-weight instruction that does not cause a trap or any undesired side effects.

The invention can be implemented in numerous ways, including as a method, a computer system and a computer readable medium. These and other aspects and advantages of the present invention will become more apparent when the detailed description below is read in conjunction with the accompanying drawings.

BRIEF DESCRIPTION OF THE DRAWINGS

The present invention will be readily understood by the following detailed description in conjunction with the accompanying drawings, wherein like reference numerals designate like structural elements, and in which.

DETAILED DESCRIPTION OF THE INVENTION

Figure 1A:
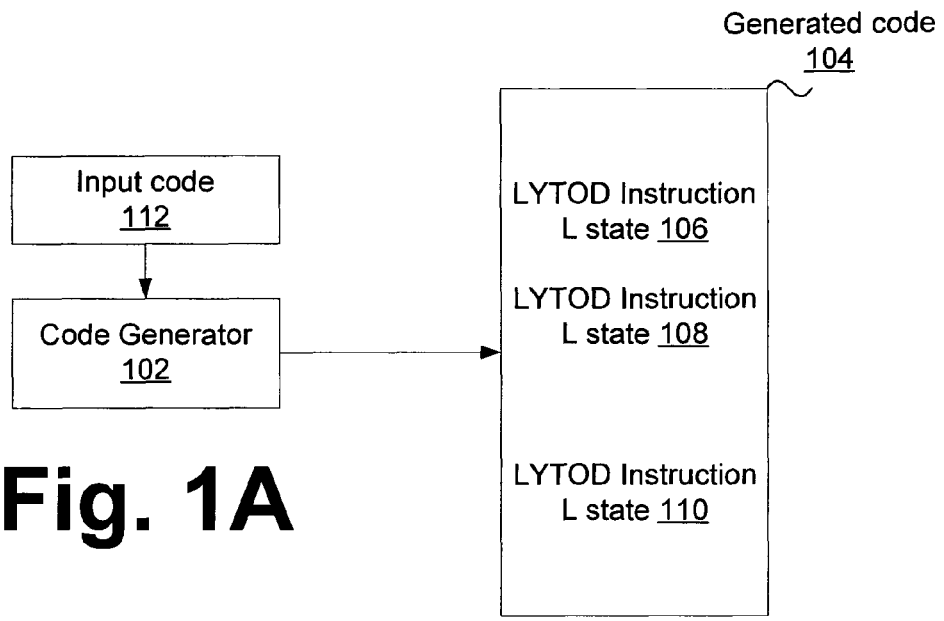
FIG. 1A depicts a computing environment in accordance with one embodiment of the invention.

As noted in the background section, alternative methods for assuring thread rendezvous are useful. These techniques should allow thread rendezvous for "read-only" code in a manner that would be more efficient than conventional polling techniques.

The invention pertains to techniques for assuring thread rendezvous for a plurality of threads executing in a computing system. As will be described below, techniques can be used to assure thread rendezvous for read-only code and in a manner that is more efficient than polling techniques.

In accordance with one aspect of the invention, a Lightweight, Yet Trappable On Demand (LYTOD) instruction can be generated for code that is executed by one or more threads. Typically, a LYTOD instruction is generated at critical points of the code in order to assure safe-point thread rendezvous. Thread rendezvous is achieved when each thread of execution is suspended at a safe point (i.e., a point where the position of all pointers are known). As will be appreciated, the LYTOD is a lightweight instruction that takes less CPU cycles to execute than a conventional polling implementation which takes four (4) or five (5) CPU cycles for each polling instruction to execute. Moreover, the LYTOD can change its behavior from a lightweight instruction to an instruction that causes a trap when executed. In other words, the LYTOD is a lightweight instruction that does not cause a trap or any other undesired side effects, yet it can be made to cause a trap on demand. The trap can invoke a trap-handler which in turn causes all threads of execution to rendezvous by changing the context of the execution to a rendezvous code. After execution of all threads has been suspended, the behavior of the LYTOD can be changed to be a lightweight instruction.

In one embodiment, the LYTOD is implemented as a read-from-a memory-address instruction that operates to load a register with a content of a valid memory location. Initially, the memory address location has a valid content so that the read-from-a memory-address instruction behaves as a light-weight instruction that does not cause a trap or any undesired side effects. When there is a need for thread rendezvous, the behavior of the read-from-a memory-address instruction is altered so that it attempts to read from an invalid memory address (e.g., zero (0) in Unix operating systems). As a result, the read-from-a memory-address instruction causes a trap which invokes a trap-handler. The context of the execution is changed to rendezvous code which assures suspension of all threads. The rendezvous code can also restore the read-from-a memory-address instruction to a light-weight instruction that does not cause a trap or any undesired side effects.

Embodiments of the invention are discussed below with reference to FIGS. 1A-4. However, those skilled in the art will readily appreciate that the detailed description given herein with respect to these figures is for explanatory purposes only as the invention extends beyond these limited embodiments.

FIG. 1A depicts a computing environment in accordance with one embodiment of the invention. In the computing environment, a code generator 102 generates a code portion 104 based on an input code 112 received as input. The generated code portion 104 includes a plurality of Light-weight, Yet Trappable On Demand (LYTOD) instructions 106, 108 and 110. Unlike a conventional instruction which has only one behavior, the LYTOD instructions 106, 108 and 110 can behave in different ways. In other words, the LYTOD instructions 106, 108 and 110 may be referred to as having two different execution states, namely a light-weight execution state (or state L) and a trapping execution state (or state T). It will be appreciated that the behavior of the LYTOD instructions 106, 108 and 110 can be changed on demand. This means that LYTOD instructions 106, 108 and 110 may be changed from the light-weight execution state (or L state) to the trapping execution state (or T state) or vice versa.

It should be noted that the code generator 102 generates a single type of LYTOD instruction, yet the behavior of the LYTOD instruction can be changed on demand. As such, unlike code patching strategy, there is no need to change (e.g., write over) the LYTOD instructions 106, 108 and 110. In other words, the behavior of the LYTOD instructions 106, 108 and 110 can effectively be changed without having to modify (e.g., write over) them.

Typically, the LYTOD instructions 106, 108 and 110 are generated at critical points or safe-points where execution of a thread can be or should be suspended. This assures that all threads can rendezvous at a safe-point. Critical points of the code with respect to safe thread rendezvous include, for example, allocation points, method invocations, and backward branches. As such, a LYTOD instruction can be generated anywhere in the program that would conventionally be polled using a polling technique, or anywhere in the code that a conventional patching technique would operate to write over instructions.

Referring back to FIG. 1A, generation of LYTOD instructions 106, 108 and 110 will now be further illustrated. Initially, the code generator 102 generates the LYTOD instructions 106, 108 and 110 in the light-weight state (or state L). This means that the LYTOD instructions 106, 108 and 110 in the light-weight state (or state L) take relatively few CPU cycles to execute. Typically, less CPU cycles are needed to execute a LYTOD instruction than polling would require (i.e., four (4) or five (5)). As will be illustrated below, only one CPU cycle is needed to execute the 108 and 110 in the light-weight state (or L state) in accordance with one embodiment of the invention. As will be illustrated below, the LYTOD instructions 106, 108 and 110 may be implemented using instruction sets that are readily available. In addition, it is possible to implement the LYTOD instructions 106, 108 and 110 such that the light-weight state (or state L) does not require a CPU cycle to execute. This can, for example, be achieved by implementing the LYTOD instructions 106, 108 and 110 as a special instruction that is added to the conventional instructions set. It should be also noted that the LYTOD instructions 106, 108 and 110 do not cause any adverse side effects (i.e., causing a fault, trap, error, etc.).

The code generator 102 can, for example, be a dynamic compiler that generates code at runtime or ahead of time compiler that generates code prior to execution time. The code portion 104 may, for example, correspond to a compiled code that is generated by the code generator 102 based on a code portion 112 received as input. The input code portion 112 can, for example, be a set of Java Bytecodes™ which have been previously compiled from another code portion (not shown) written in Java™ programming language. As such, the code generator 102 can, for example, be implemented in a virtual machine.

In any case, the code generator 102 initially generates LYTOD instructions 106, 108 and 110 which have the light-weight property when executed (i.e., instructions are in the L execution state). Moreover, these LYTOD instructions 106, 108 and 110 instructions can be made trappable on demand. When an instruction is made trappable, the instruction causes a trap which typically invokes a trap-handler. To further illustrate, FIG. 1B depicts a computing environment which includes a runtime system 152, execution threads 154 and 156, and a trap handler 158.

Figure 1B:
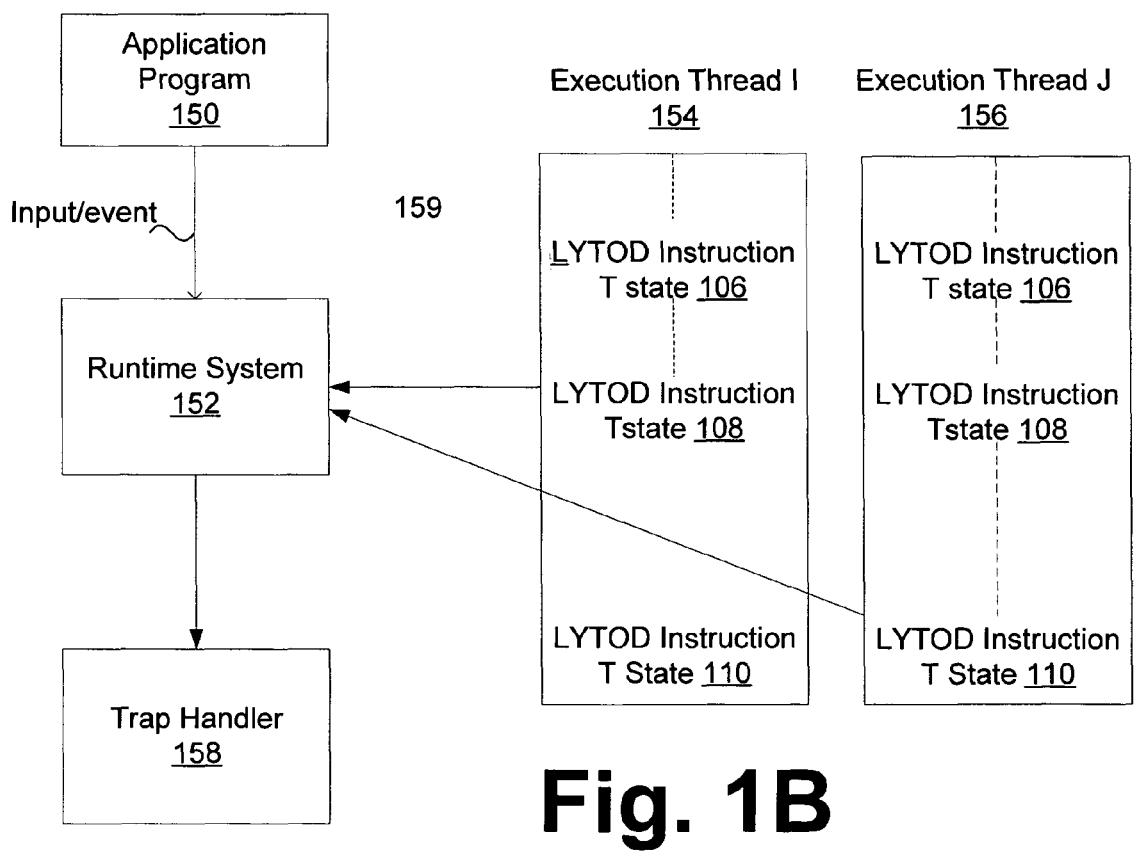
FIG. 1B depicts a computing environment which includes a runtime system, execution threads, and a trap handler.

Referring to FIG. 1B, the execution threads 154 and 156 correspond to code portions that include a plurality of LYTOD instructions. These LYTOD instructions have been generated by the code generator 102 of FIG. 1A. However, it should be noted that the same LYTOD instructions 106, 108 and 110 generated by the code generator are depicted in FIG. 1B in a trapping execution state (or T state) instead of the light-weight state (or L state) depicted in FIG. 1A. This means that when any of the instructions 106, 108 and 110 is executed, a trap is caused. By way of example, when a LYTOD instruction 108 in the execution thread-I 154 is executed, a trap is caused. Similarly, when a LYTOD instruction 110 in the execution thread-J 156 is executed, a trap is caused. When a trap is caused, a trap-handler 158 is invoked. Typically, the trap-handler 158 is invoked through the runtime system 152. In any case, when a trap is caused by execution of a LYTOD instruction in T state, the execution of a thread is suspended at the point where the LYTOD instruction was executed in that thread. The trap handler, among other things, can be used to cause a suspended thread to remain suspended until all threads of execution have been suspended at a safe point. This can be accomplished by causing the context of the execution of the thread to be changed to a rendezvous point where a thread remains suspended until all other threads have been suspended and reach the rendezvous point. When all the threads of execution have been suspended at the same point (i.e., reach a rendezvous point), the LYTOD instructions 106, 108 and 110 can be changed back to the light-weight (L state). The state of the LYTOD instructions 106, 108 and 110 can be changed by the runtime system 152 on demand. This switch can be made, for example, when an input or event 159 is received from an application program 150. As such, the runtime system 152 can change the state of the LYTOD instructions 106, 108 and 110 from the execution state L to execution state T on behalf of an application program 150. Also, an application (e.g., garbage collector) may be able to directly change the state of the LYTOD instructions 106, 108 and 110 from the light-weight (L) state to the trapping (T) state so that all threads can rendezvous at a safe point. After all threads have rendezvoused, the LYTOD instructions 106, 108 and 110 may be switched back to the light-weight (L) state. Switching the execution state of a LYTOD instruction will be further illustrated in FIG. 3.

Figure 2:
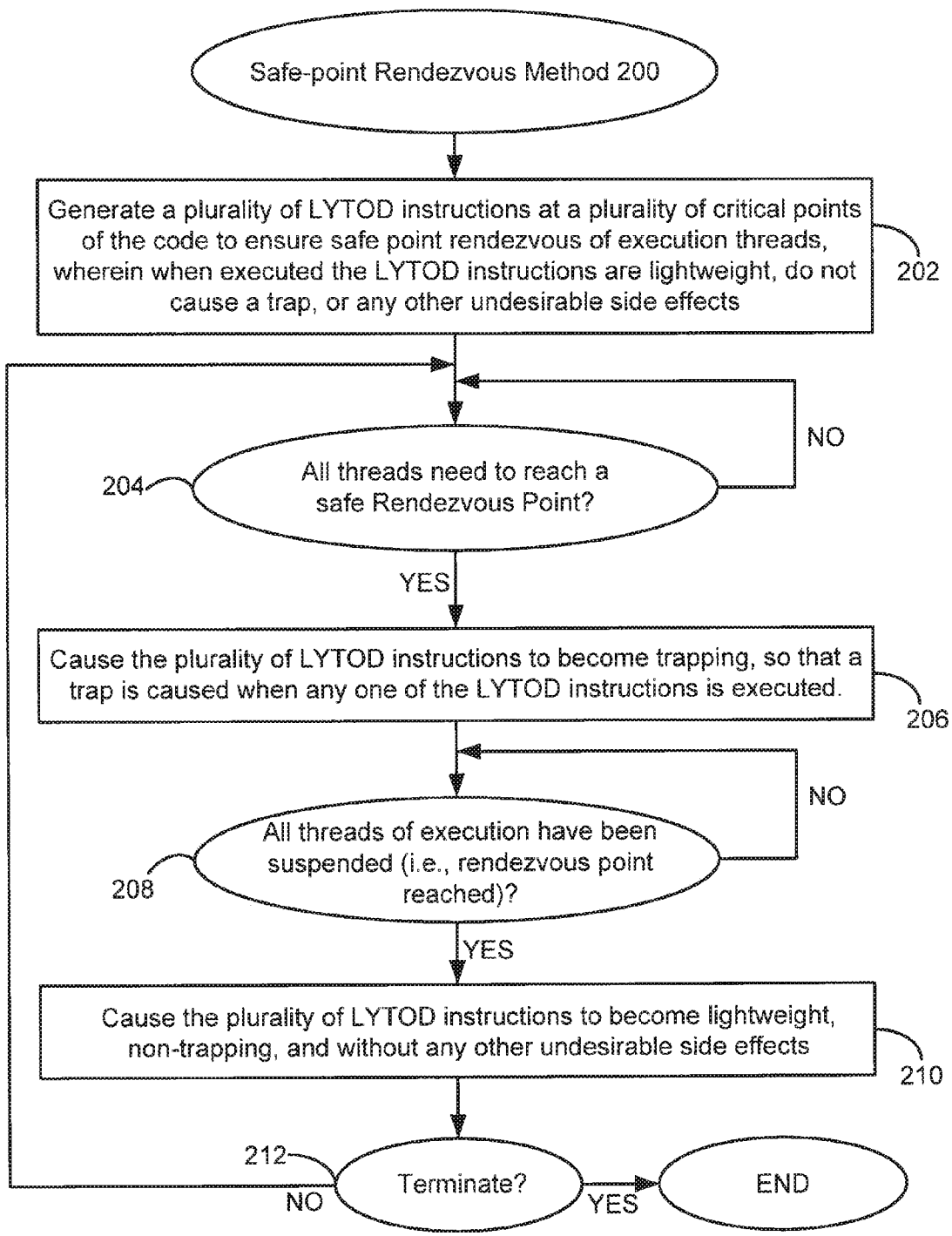
FIG. 2 is a safe-point rendezvous method for causing all execution threads to suspend execution and rendezvous at a safe point is depicted.

However, referring now to FIG. 2, a safe-point rendezvous method 200 for causing all execution threads to suspend execution and rendezvous at a safe point is depicted. Initially, a plurality of light-weight, yet Trappable On Demand (LYTOD) instructions are generated 202. Typically, the Light-weight, yet Trappable On Demand (LYTOD) are generated at the critical points to ensure safe-point rendezvous of execution threads. As noted above, these critical points can, for example, be the allocation points, method invocations, and backward branches. In general, any point in the code can be considered to be a critical point if there is no need to generate a Trappable On Demand (LYTOD) instruction in order to ensure that the thread encounter the LYTOD instruction and suspend. Again, It should be noted that the LYTOD instructions are initially generated so that when executed they behave as a light-weight instruction. These LYTOD may be referred to as LYTOD instructions in a light-weight (L) state. It should also be noted that the LYTOD instructions when initially generated do not cause a trap, or any undesirable side effects when initially generated 202.

After the LYTOD instructions are generated 202 as light-weight instructions (or in the light-weight state), it is determined 204 whether all threads of execution need to rendezvous at a safe-point. This determination can, for example, be made when a request is received from an application (e.g., garbage collector) to have all threads suspend execution. By way of example, a request can be received when there is a need to perform a garbage collection cycle as a result of an unsuccessful memory allocation attempt. In general, the determination 204 can be made based on a need to have all threads meet at a safe-point for synchronization or any other purpose.

In any case, when it is determined 204 that all threads should rendezvous at a safe-point, the behavior of the LYTOD instructions are changed. More particularly, the plurality of LYTOD instructions are caused 206 to become trapping instructions (i.e., switched to a trapping state). This means that whenever a LYTOD instruction is executed, a trap is caused and the execution of that thread is suspended. The execution of the thread is suspended until all execution threads have suspended at a safe-point (i.e., meet at the rendezvous point).

Accordingly, a determination 208 is made as to whether all threads of execution have been suspended (i.e., rendezvous point has been reached by all threads). By way of example, this determination may be made based on a thread-count to determine whether all threads of execution have been suspended. When it is determined 208 that all threads of execution have been suspended, the behavior of the plurality of LYTOD instructions is changed back to its original form. More particularly, the LYTOD instructions are caused 210 to become lightweight, non-trapping, and without any other undesirable side effects.

Thereafter, if it is determined 212 that the safe-point rendezvous method 200 should not terminate, the safe-point rendezvous method 200 proceeds to operation 204 where it is determined whether all threads should rendezvous at a safe-point. The safe-point rendezvous method 200 ends when it is determined 212 that the safe-point rendezvous method 200 should end (e.g., when the system shuts down or there is no need or desire to use the rendezvous point method 200).

Figure 3A:
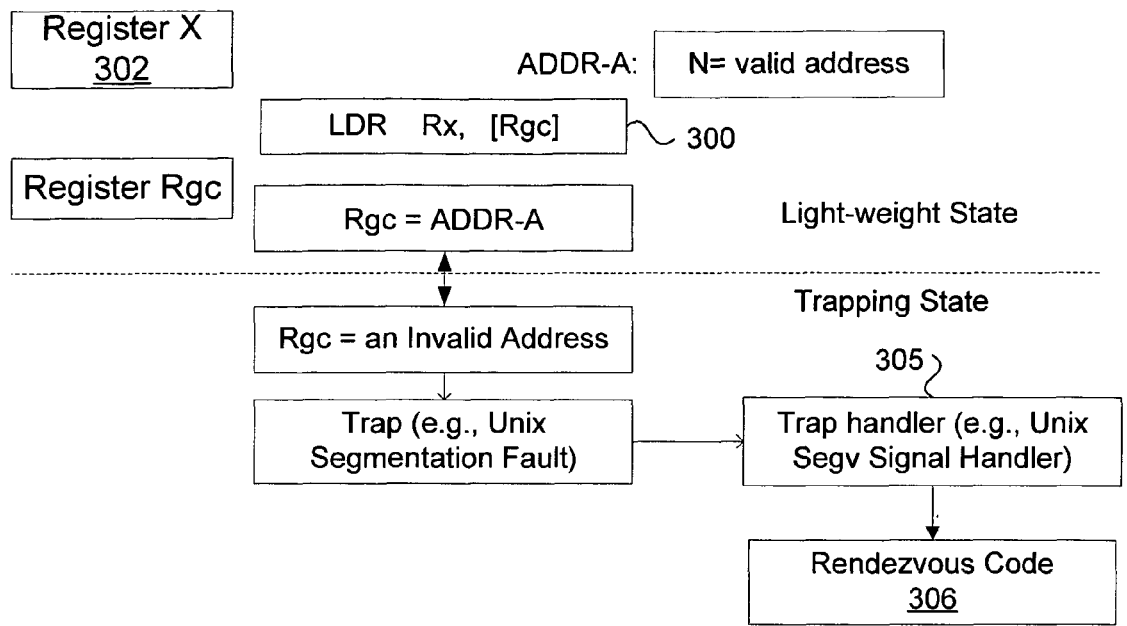
FIG. 3A illustrates a LYTOD instruction which can be implemented using operation that are readily available in many computing systems in accordance with one embodiment of the invention.

FIG. 3A illustrates a LYTOD instruction which can be implemented using operations that are readily available in many computing systems in accordance with one embodiment of the invention. As shown in FIG. 3, a LYTOD instruction 300 can be implemented as a "read-from-memory" instruction 300 which operates to load a Register-X 302 with the content of an ADDR-A memory address. In other words, initially, the register Rgc (Rgc) is equal to ADDR-A (Rgc=ADDR-A). As a result of the execution of the "read-from-memory" instruction 300, the Register-X 302 will have the value of the content of the ADDR-A memory address. It should be noted that memory address (ADDR-A) is a valid memory address. This means that LYTOD instruction 300 does not cause a trap or any other undesirable side effects. By way of example, memory address (ADDR-A) may be a reserved valid address that will not be used for any other purpose.

It should also be noted that the LYTOD instruction 300 is a relatively light-weight instruction which typically requires only one CPU cycle to execute. As will also be appreciated, there is no need for flushing and/or waiting for the LYTOD instruction 300 to complete because the result of the LYTOD instruction 300 is not really used. In addition, it is likely that the LYTOD instruction 300 will be cached because it will be executed frequently and/or it may be possible to explicitly cache the LYTOD instruction 300. As such, the LYTOD instruction 300 can be implemented using instructions (e.g., read from memory) that are readily available in many computing environments.

In any case, because the memory address (ADDR-A) is a valid memory address, the LYTOD instruction 300 can behave as a light-weight instruction that is executed efficiently without causing a trap or any other undesirable side effects. However, the same LYTOD instruction 300 can become a trapping instruction by making it attempt to read from an invalid address. As illustrated in FIG. 3A, Rgc can be assigned an invalid address which causes a trap when the LYTOD instruction 300 is executed.

By way of example, in the UNIX operating system environment, Rgc can be assigned the zero (0) value which will cause a segmentation fault error. In any case, when a trap has been caused, a trap handler (or a signal-handler) is invoked. For example, a Seg-v signal-handler is invoked in the Unix operating system environment. As will be further discussed below, a trap handler can be used to switch the context of the execution to a rendezvous code 306. The rendezvous code 306 can suspend the thread until all threads have been suspended (i.e., safe-point rendezvous has been accomplished). Thereafter, the context of the execution can be restored by the rendezvous code 306. In other words, the suspended thread may resume execution after rendezvousing at the rendezvous code 306. In addition, the rendezvous code 306 can restore Rgc to ADDR-A again. As a result, the LYTOD instruction 300 can again behave as a light-weight instruction that is executed efficiently without causing a trap or any other undesirable side effects. When there is a need to have all threads rendezvous at a safe-point, Rgc can be set to invalid address again (e.g., zero(0) in Unix operating environment)

As noted above, a trap-handler can be used to switch the context of the execution for each thread to rendezvous code 306. Various techniques may be used to accomplish this context switching. Some of these techniques are discussed below.

In one embodiment, Rgc is implemented as a global register which is viable to all threads. This means that Rgc can easily be changed, for example, by the runtime system to a constant invalid address (e.g., address Zero(0)) in Unix operating environment. This also means that the trap-handler 305 may receive the Program Counter (PC) as an argument to change the context of the execution to the rendezvous point. By way of example, in the Unix operating environment, the trap-handler 305 may be implemented as Seg-v Signal-Handler responsive to a UNIX Segmentation Fault received as a result of attempting to read from an invalid address. Hence, the LYTOD instruction 300 can be implemented using instructions and system capabilities that are readily available in many computing environments (e.g., Unix environment).

In any case, the trap handler 305 can change the context of execution to the rendezvous point (rendezvous code 306) when Rgc is implemented as a global register. The rendezvous code 306 can easily access the global register to restore the valid value into the global register when all threads have rendezvoused.

In another embodiment, Rgc is implemented as a local register. As such, the context (or a copy) of the Rgc can be changed for each thread. In other words, the context (or a copy) of Rgc for each thread can be set to an invalid or valid value on demand. This can be achieved, for example, by direct access through a kernel or a thread library which may be available or provided as a special operating system function. Again, the LYTOD instruction 300 can be implemented using instructions and system capabilities that are readily available in many computing environments. By way of example, in the Unix environment, a user-defined signal (Sig-user [1-4]) can be sent to each thread when there is a need for thread rendezvous. This causes a Sig-user signal-handler to be invoked. As will be appreciated, the Sig-user signal-handler is a user-defined signal-handler. As such, the Sig-user signal-handler may be used to receive the context of the execution for each thread and change the context of execution to the rendezvous point. Hence, the trap-handler 305 can behave as a user-defined signal-handler. In any case, trap-handler 305 can be implemented to change the context of execution to the rendezvous point (rendezvous code 306) when Rgc is implemented as a local register. The rendezvous code 306 can restore the value of Register-X when all threads have rendezvoused at a safe point.

Figure 3B:
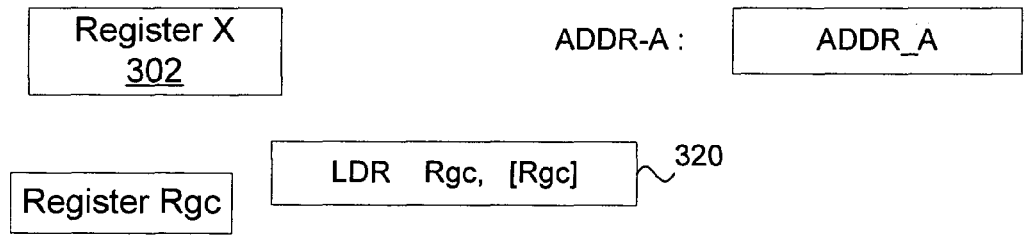
FIG. 3B illustrates a LYTOD instruction in accordance with another embodiment of the invention.

FIG. 3B illustrates a LYTOD instruction 320 in accordance with another embodiment of the invention. As illustrated in FIG. 3B, the LYTOD instruction 320 is implemented such that the content of the memory address ADDR-A is initially equal to the ADDR-A itself. By way of example, if memory address ADDR-A is equal to O×4,000, the content of ADDR-A is initially set to be O×4,000. Accordingly, this embodiment requires only one register to be reserved. However, similar to the embodiment discussed above, a trap can be caused (or a signal can be thrown) to invoke a trap handler which is used to switch the context of the execution for each thread to rendezvous code 306 in accordance with various techniques.

Figure 3C:
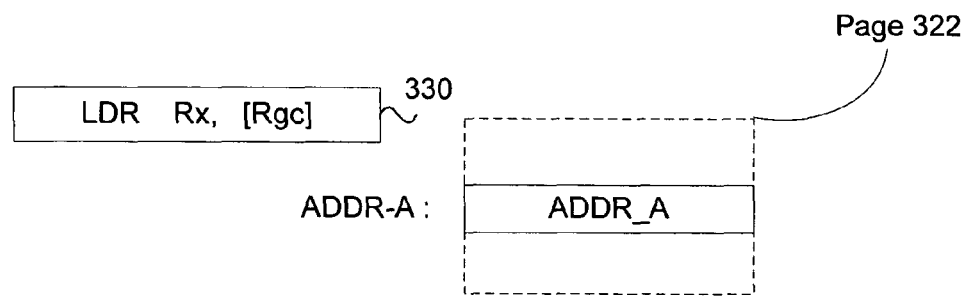
FIG. 3C illustrates a LYTOD instruction in accordance with another embodiment of the invention.

FIG. 3C illustrates a LYTOD instruction 330 in accordance with another embodiment of the invention. Similar to the embodiment discussed above, the LYTOD instruction 330 is a read-from-memory instruction. However, in this embodiment, ADDR-A is implemented as a page 332. Typically, page 332 is a dedicated page. In any case, page 332 can be page protected/unprotected against read instructions. The protection of the page can be initially set to allow the LYTOD instruction 330 to execute. When thread rendezvous is desired, the page protection can be modified to disallow any reads from page 332. As a result, a trap (or signal) is caused and a trap (or signal) handler can be used to change the context of the execution to the rendezvous code.

It should also be noted that the invention contemplates many other embodiments of the LYTOD instruction 330 as possible. For example, another light-weight instruction (e.g., a math instruction) may be used to cause a trap (e.g., division by zero). In general, it is required that the LYTOD instruction 330 take less CPU cycles than polling techniques (e.g., four (4) or five (5) CPU cycles). In addition, the LYTOD instruction 330 can be made to cause a trap to invoke a trap (or signal) handler that is, in turn, used to change the context of the execution to the rendezvous code.

Figure 4:
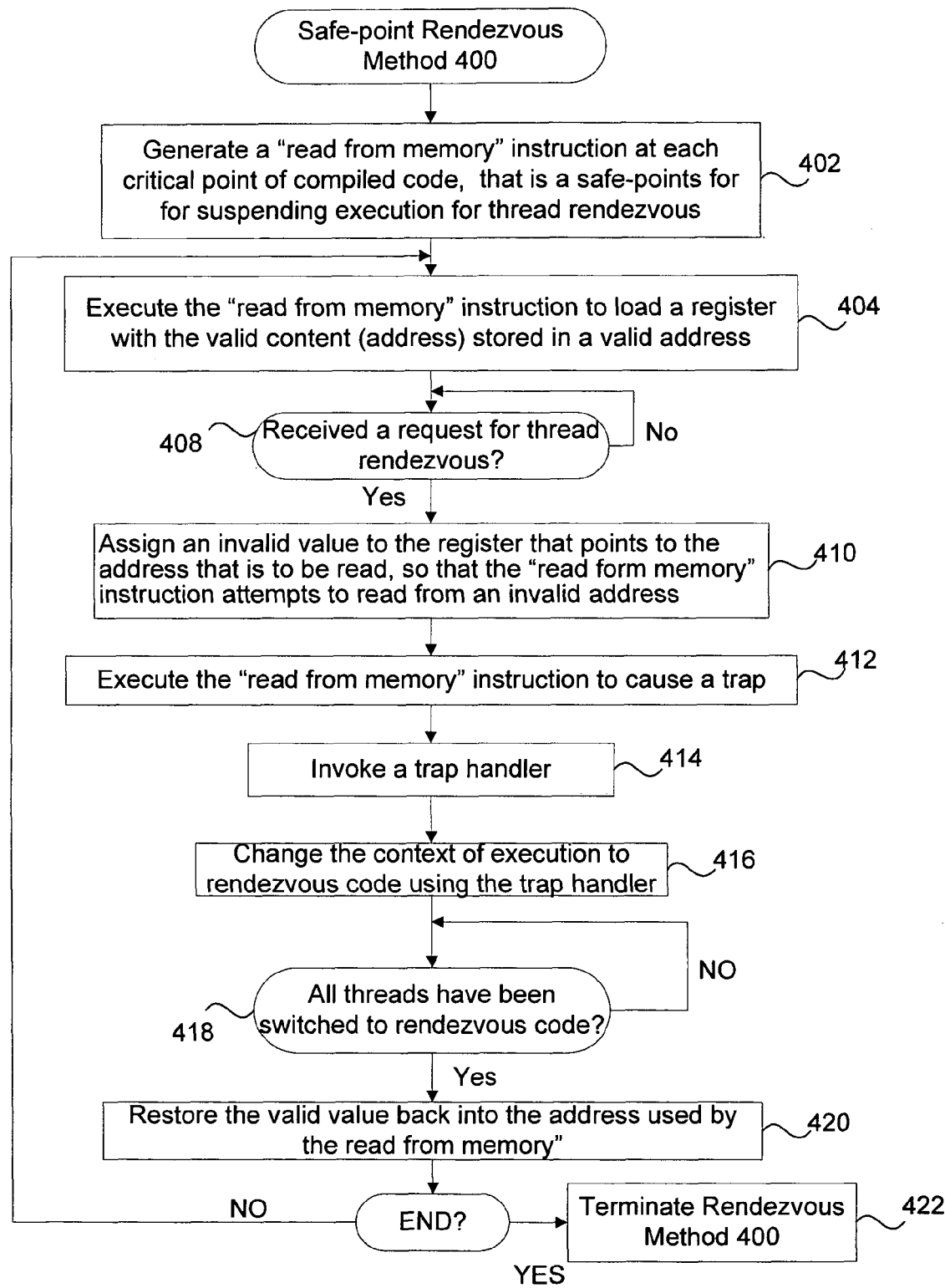
FIG. 4 illustrates safe-point rendezvous method for causing all execution threads to suspend execution and Rendezvous at a safe point in accordance with another embodiment of the invention.

FIG. 4 illustrates safe-point rendezvous method 400 for causing all execution threads to suspend execution and rendezvous at a safe point in accordance with another embodiment of the invention. Initially, a "read from memory" instruction at each critical point of the compiled code is generated 402. The compiled code can, for example, be generated by a compiler (e.g., dynamic compiler, ahead of time compiler). In any case, the "read from memory" instruction is generated at safe points of execution for suspending the thread. In addition, the "read from memory" instruction is generated at a point that is considered to be critical to assuring safe thread rendezvous (e.g., allocation points, function calls, backward branches). It should also be noted that the "read from memory" instruction is a light-weight instruction.

After the "read from memory" instruction is generated 402 at each critical point of the compile code, the instructions are executed 404. As a result, a designated register is loaded with the content of an address. It should be noted that both the address and its content are assigned a valid value. However, when it is determined at operation 406 that a request for thread rendezvous has been received, an invalid value is assigned 410 to the register that points to the address that is to be read, so that the "read form memory" instruction will attempt to read from an invalid address. As a result, when the "read from memory" instruction is executed 412, a trap is caused because the "read from memory" instruction attempts to assign an invalid address (e.g., zero in Unix operating environment) to the assigned register. The trap caused 412 by execution of the "read from memory" instruction invokes 414 a trap handler. Next, the context of the execution is changed 416 to a rendezvous code using the trap handler. When it is determined 418 that the context of execution for all threads have been switched to the rendezvous code, the valid value is restored 420 back into the address used by the "read from memory" instruction. If it is determined 420 that rendezvous method 400 should not terminate, the "read from memory" instruction is executed 404 without causing a trap and the rendezvous method 400 proceeds in the same manner as discussed above. The rendezvous method 400 ends when it is determined that it should be terminated. The rendezvous method 400 can end, for example, when execution of the program has ended or there is no desire to allow causing all execution threads to suspend execution and to rendezvous at a safe point.

The many features and advantages of the present invention are apparent from the written description, and thus, it is intended by the appended claims to cover all such features and advantages of the invention. Further, since numerous modifications and changes will readily occur to those skilled in the art, it is not desired to limit the invention to the exact construction and operation as illustrated and described. Hence, all suitable modifications and equivalents may be resorted to as falling within the scope of the invention.

What is claimed is:

1. A method, comprising:
    inserting an instance of read-from-memory instruction at each of a plurality of safe points in one or more code portions executed by a plurality of threads, the instruction being configured so that when executed by a processor, the instruction causes the processor to read a page protected memory address, said page protected memory address being set to be unprotected against a read;

receiving a request for thread rendezvous;
    in response to the thread rendezvous request, modifying the page protected memory address to become protected against a read, wherein when each of the read-from-memory instructions attempts to read the page protected memory address in said plurality of threads a trap handler is invoked that results in the execution of each of said plurality of threads being suspended at a respective safe point;
    determining whether or not execution of all of said plurality of threads has been suspended, and, if so, modifying the page protected memory address to become unprotected against a read; and
    otherwise, continuing to suspend execution of the threads.

2. A method for providing safe-point rendezvous for a plurality of threads executing in a computer system, comprising:
    generating an instruction at a plurality of safe points in code executable by one or more of the threads, wherein the instructions each are operable in at least a lightweight state and in a trapping execution state, wherein each of the instructions are placed in the lightweight state in the generating step, and wherein the instructions are each non-trapping in the lightweight state and require one or fewer CPU cycles to execute in the lightweight state;
    receiving a request to rendezvous the threads in the computer system;
    in response to the receiving of the rendezvous request, causing all of the instructions to switch to the trapping execution state to cause a trap handler to be invoked when each of the instructions is executed; and
    after all the threads have been suspended, causing all of the instructions to switch to the lightweight state, whereby the instructions are non-trapping when executed,
    wherein each of the instructions comprises a read-from-memory instruction that operates to load a register with content at a pre-defined memory address, wherein the pre-defined memory address is a valid address when the instruction is in the lightweight state, and wherein the causing of the instructions to switch to the trapping execution state comprises assigning an invalid address to each of the pre-defined memory addresses.

3. The method of claim 2, wherein the causing of all the instructions to switch to the lightweight state includes restoring the predefined memory addresses to the valid addresses assigned during the generating of the instructions.

4. The method of claim 2, wherein the register is a global register viable to all the threads.

5. The method of claim 2, wherein the register is a local register that is changed for each of the threads during the causing of the instructions to switch to the trapping execution state.

6. The method of claim 2, wherein the trap handler switches execution to a rendezvous code that suspends the corresponding thread until all the threads have been suspended and that, after all the threads have been suspended, restores the register to the valid address.

7. The method of claim 2, wherein the request to rendezvous is generated by a garbage collector running in the computer system.

8. The method of claim 7, wherein the garbage collector further performs the causing of all the instructions to switch to the trapping execution state.

9. The method of claim 7, wherein a runtime system of the computer system performs the causing of all the instructions to switch to the trapping execution state.

10. A method for providing thread rendezvous for a plurality of threads executing in a computer system, comprising:

provide a light weight yet trappable on demand (LYTOD) instruction at a number of critical points in read-only code executable by one or more of the threads, wherein the LYTOD instructions each are operable in at least a lightweight state and in a trapping execution state, wherein each of the instructions are placed in the lightweight state in the generating step, and wherein the instructions are each non-trapping in the lightweight state;

causing all of the instructions to switch to the trapping execution state to cause a trap handler to be invoked when each of the instructions is executed; and after all the threads have been suspended, causing all of the instructions to switch to the lightweight state, whereby the instructions are non-trapping when executed, wherein each of the instructions comprises a read-from-memory instruction that operates to access a pre-defined memory address, wherein the pre-defined memory address is a valid address when the instruction is in the lightweight state, and wherein the causing of the instructions to switch to the trapping execution state comprises assigning an invalid address to each of the pre-defined memory addresses.

11. The method of claim 10, wherein the LYTOD instructions each require less than about one CPU cycle to execute when in the lightweight state.

12. The method of claim 10, wherein the access to the pre-defined memory address involves loading a global register viable to all the threads with contents at the pre-defined memory address.

13. The method of claim 10, wherein the access to the pre-defined memory address involves loading a local register that is changed for each of the threads during the causing of the instructions to switch to the trapping execution state.

14. The method of claim 10, wherein the trap handler switches execution to a rendezvous code that suspends the corresponding thread until all the threads have been suspended and that, after all the threads have been suspended, restores the pre-defined memory address to a valid address.

15. The method of claim 10, wherein the causing all of the instructions to switch to the trapping execution state to cause a trap handler to be invoked is performed in response to receiving a request to rendezvous generated by a garbage collector running in the computer system.

16. The method of claim 15, wherein the garbage collector further performs the causing of all the instructions to switch to the trapping execution state.

* * * * *